United States Patent
Penugonda et al.

(10) Patent No.: US 12,106,161 B2
(45) Date of Patent: Oct. 1, 2024

(54) AUGMENTED REALITY OBJECT INTERACTION AND NOTIFICATION

(71) Applicant: International Business Machines Corporation, Armonk, NY (US)

(72) Inventors: Pavan Kumar Penugonda, Visakhapatnam (IN); Sri Harsha Varada, Visakhapatnam (IN); Saraswathi Sailaja Perumalla, Visakhapatnam (IN); Venkata Ratnam Alubelli, Visakhapatnam (IN); Rachana Vishwanathula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 17/517,024

(22) Filed: Nov. 2, 2021

(65) Prior Publication Data

US 2023/0138204 A1 May 4, 2023

(51) Int. Cl.
*G06F 9/54* (2006.01)
*G02B 27/01* (2006.01)
*G06T 19/00* (2011.01)
*G06V 20/20* (2022.01)

(52) U.S. Cl.
CPC ......... *G06F 9/542* (2013.01); *G02B 27/0101* (2013.01); *G06T 19/006* (2013.01); *G06V 20/20* (2022.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 10,909,759 B2* | 2/2021 | Kaino | | G06F 3/048 |
| 11,010,949 B2* | 5/2021 | DeLuca | | G02B 27/0172 |
| 11,176,755 B1* | 11/2021 | Tichenor | | G06T 19/20 |
| 11,188,156 B2* | 11/2021 | Victor-Faichney | | G06F 3/011 |
| 11,227,445 B1* | 1/2022 | Tichenor | | G06Q 50/01 |
| 11,409,405 B1* | 8/2022 | Hlavac | | G06T 19/20 |
| 11,532,141 B1* | 12/2022 | Vierra | | G06Q 10/101 |
| 11,567,788 B1* | 1/2023 | Khemka | | H04L 67/55 |
| 2002/0087649 A1* | 7/2002 | Horvitz | | H04L 51/00 709/207 |
| 2011/0313779 A1* | 12/2011 | Herzog | | G06Q 30/02 715/744 |
| 2013/0147687 A1* | 6/2013 | Small | | G06F 3/015 345/8 |

(Continued)

OTHER PUBLICATIONS

US 11,651,451 B1, 05/2023, Liu (withdrawn)*

(Continued)

*Primary Examiner* — Adam M Queler
*Assistant Examiner* — Nathan K Shrewsbury
(74) *Attorney, Agent, or Firm* — Tihon Poltavets

(57) ABSTRACT

The present specification describes a computer-implemented method. According to the method, an object within a range of vision of a user is identified via a capture device on a wearable augmented reality (AR) system worn by the user. A user interaction with an identified object within the range of vision of the user is monitored. A notification related to the identified object is generated and presented on a display device of the wearable AR system.

20 Claims, 10 Drawing Sheets

(56) References Cited

U.S. PATENT DOCUMENTS

| | | | |
|---|---|---|---|
| 2014/0052680 A1* | 2/2014 | Nitz | G06N 5/04 |
| | | | 706/46 |
| 2014/0176603 A1 | 6/2014 | Kumar | |
| 2014/0235282 A1* | 8/2014 | Kansal | H04L 51/043 |
| | | | 455/466 |
| 2014/0240122 A1* | 8/2014 | Roberts | G08B 3/10 |
| | | | 340/539.11 |
| 2014/0240349 A1 | 8/2014 | Tuukkanen | |
| 2015/0235435 A1* | 8/2015 | Miller | H04L 67/10 |
| | | | 345/633 |
| 2015/0371444 A1* | 12/2015 | Hara | G01B 11/14 |
| | | | 345/633 |
| 2016/0071325 A1* | 3/2016 | Callaghan | G06Q 30/06 |
| | | | 345/633 |
| 2016/0180797 A1* | 6/2016 | Kamhi | G06F 9/542 |
| | | | 345/520 |
| 2016/0248865 A1* | 8/2016 | Dotan-Cohen | H04L 67/55 |
| 2017/0027529 A1* | 2/2017 | Frieder | H04W 52/0254 |
| 2017/0039339 A1* | 2/2017 | Bitran | G16H 50/30 |
| 2017/0103581 A1* | 4/2017 | Mullins | G06F 18/24 |
| 2017/0192620 A1* | 7/2017 | Kim | G02B 27/0179 |
| 2017/0323376 A1* | 11/2017 | Glaser | G06Q 20/203 |
| 2017/0372606 A1 | 12/2017 | Yoon | |
| 2018/0077097 A1* | 3/2018 | Alfaro | H04L 51/216 |
| 2018/0150903 A1* | 5/2018 | Waldron | G06F 3/011 |
| 2018/0176885 A1* | 6/2018 | VanBlon | H04W 4/02 |
| 2018/0232921 A1* | 8/2018 | Smith | G06Q 30/0201 |
| 2018/0253900 A1* | 9/2018 | Finding | G06T 19/006 |
| 2018/0343338 A1* | 11/2018 | Prasad | H04W 4/23 |
| 2019/0065970 A1* | 2/2019 | Bonutti | G06T 7/0012 |
| 2019/0097896 A1* | 3/2019 | Kritzler | G06F 3/014 |
| 2019/0205839 A1* | 7/2019 | Dotan-Cohen | H04L 67/535 |
| 2019/0235936 A1* | 8/2019 | Murdock | H04W 68/02 |
| 2019/0362528 A1* | 11/2019 | DeLuca | G06F 3/011 |
| 2019/0371012 A1 | 12/2019 | Flexman | |
| 2019/0378205 A1* | 12/2019 | Glaser | G06Q 30/0635 |
| 2020/0005542 A1* | 1/2020 | Kocharlakota | G06F 3/0346 |
| 2020/0042793 A1* | 2/2020 | Gotow | G06F 21/62 |
| 2020/0099645 A1* | 3/2020 | Aggarwal | H04W 4/50 |
| 2020/0272231 A1* | 8/2020 | Klein | G06T 19/006 |
| 2020/0286355 A1* | 9/2020 | Baker, Jr. | G08B 21/0255 |
| 2020/0294097 A1* | 9/2020 | Spivack | G06F 3/04883 |
| 2021/0049822 A1* | 2/2021 | Meriaz | G06F 3/0482 |
| 2021/0072819 A1* | 3/2021 | Nguyen | G06F 3/016 |
| 2021/0209364 A1* | 7/2021 | Park | G06T 19/006 |
| 2021/0383302 A1* | 12/2021 | Covell | G06N 20/00 |
| 2022/0019284 A1* | 1/2022 | Kaifosh | G06F 3/016 |
| 2022/0331047 A1* | 10/2022 | Shelton, IV | A61B 17/07207 |
| 2022/0383732 A1* | 12/2022 | Tabkhivayghan | G08G 1/005 |
| 2023/0138204 A1* | 5/2023 | Penugonda | G06F 9/542 |
| | | | 715/705 |

OTHER PUBLICATIONS

J. J. Daniels, S. H. Regli and J. L. Franke, "Support for intelligent interruption and augmented context recovery," Proceedings of the IEEE 7th Conference on Human Factors and Power Plants, Scottsdale, Az, USA, 2002, pp. 7-7, doi: 10.1109/HFPP.2002.1042862 (Year: 2002).*

IP.com; "Method and System for Proactively Rendering Support Information Related to a User's Predicted Actions/Intentions"; Mar. 22, 2019.

Jie Guan; Ocad University; "Exploring a Mixed Reality Framework for the Internet of Things"; https://www.youtube.com/watch?v=o80bpAzf24E; IEEE Virtual Reality Conference; Video viewed online on Oct. 26, 2021; Time: 2 minutes 44 seconds.

Perumal; "IoT based activity recognition among smart home residents"; Oct. 2017; Abstract Only Provided.

TeamViewer ; "Empower Your Frontline Workforce with Augmented Reality Workflows"; https://www.teamviewer.com/en-us/solutions/frontline/?utm_source=google&utm_medium=cpc&utm_campaign=in|nb|pr|20|oct|broad-Ubimax-frontline-AR-sn|lead|t0|0&utm_content=AR-Technology&utm_term=%2Baugmented%20%2Breality%20%2Btechnology&gclid=Cj0KCQjw9YWDBhDyARIsADt6sGaKpThnbxwFJmJ48gHII7ooyX-BmYHqA_EtUnhjIIFKAOaw0-cL6PlaApUkEALw_wcB; video viewed online on Oct. 26, 2021.

* cited by examiner

AUGMENTED REALITY OBJECT INTERACTION AND NOTIFICATION

BACKGROUND

The present invention relates to augmented reality systems, and more specifically to the monitoring of user interactions with objects and generation of notifications based on the interactions.

SUMMARY

According to an embodiment of the present invention, a computer-implemented method is described. According to the method, an object is identified via a capture device on a wearable augmented reality (AR) system worn by the user. A user interaction with an identified object is monitored. A notification related to the identified object is generated and presented on a wearable display device of the wearable AR system.

The present specification also describes a wearable AR system. The wearable AR system includes a capture device to capture images viewed by a user of the wearable AR system. A controller of the wearable AR system identifies an object within a captured image and generates a notification related to the identified object. The notification includes a task to be completed that relates to the identified object. The wearable AR system also includes a wearable display device to present the notification to the user of the wearable AR system.

The present specification also describes a computer program product. The computer program product includes a computer readable storage medium having program instructions embodied therewith. The program instructions are executable by a processor and are to cause the processor to capture images viewed by a user of a wearable augmented reality (AR) system. During a calibration period, the program instructions are also executable by the processor to cause the processor to 1) monitor user interaction with a first set of identified objects within captured images and 2) generate a routine of the user with the first set of identified objects. The program instructions are also executable by the processor, to cause the processor to 1) identify an object within a range of vision of the user via a capture device on the wearable AR system, 2) categorize an identified object as belonging to the first set of identified objects associated with the routine or a second set of identified non-routine objects, and 3) prioritize a task associated with an identified object. The program instructions are also executable by the processor to cause the processor to generate a notification related to the identified object and present the notification on a display device of the wearable AR system based on a priority of the task associated with the identified object, a priority of a current activity of the user, and which set the identified object belongs to.

DETAILED DESCRIPTION

Figure 1:
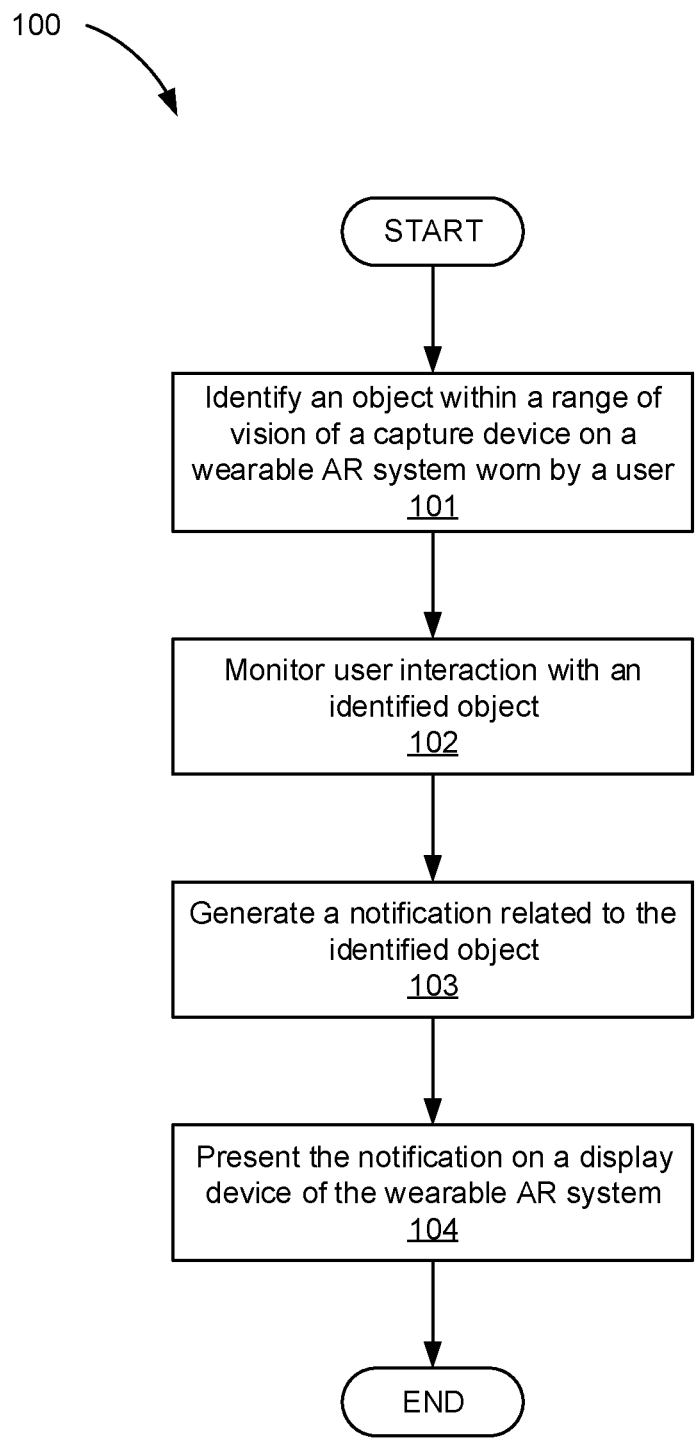
FIG. 1 depicts a computer-implemented method for monitoring and generating notifications for objects in an AR system, according to an example of the principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Augmented reality (AR) systems are electronic devices that create an enhanced version of the physical world by providing additional stimuli to a user of the AR system. For example, an AR system may overlay digital images on top of a physical environment viewed by a user. Doing so may facilitate enhanced and new forms of communication, entertainment, and may otherwise affect the day-to-day life of a variety of users.

For example, a user may have particular activities or tasks that they want to complete over the course of a day. However, with the numerous activities a user engages in, a user may forget about some of these activities and tasks. That is, an individual may have activities they want to incorporate into their daily routine or a user may subconsciously perform certain activities that they desire to continue. However, as there are many activities that a user performs every day, certain of these activities may be forgotten and go unperformed. Accordingly, the present systems and methods assist the user in performing these activities in a non-disturbing manner, such that the user can accomplish the daily activities and other recommended activities.

Specifically, the present specification describes a wearable AR device which apprises the user of uncompleted daily tasks (that are either part of an existing routine for the user or are recommended to become part of the user's routine) through interactive and customized AR messages/alerts/reminders. In some examples, the notifications may be overlaid on the object that is within the user range of vision.

In one specific example, the wearable AR system cooperates with network-connected devices, which may be smart devices or internet of things (IoT) devices, to determine the characteristics of the generated notifications. In this example, the network-connected device/AR system communication leverages the interaction of the user with the network-connected device. In some examples, the AR system accounts for a current activity of the user and displays the notification, or delays display, through a wearable display device based on a relative priority of the current activity with the routine or non-routine based recommended activity.

Such a system, method, and computer program product may 1) alter a display screen to present customized information relating to objects that are presented thereon; 2) track user interactions with objects to determine which notifications to generate; and 3) analyze a user's history to determine when to present a notification and the form of the notification.

As used in the present specification and in the appended claims, the term "a number of" or similar language is meant to be understood broadly as any positive number including 1 to infinity.

FIG. 1 depicts a computer-implemented method (100) for monitoring and generating notifications for objects in a wearable AR system, according to an example of the principles described herein. That is, the present method (100) allows the wearable AR system to recognize objects near a user that are either network-connected devices or detected by network-connected devices. The wearable AR system then visually presents information that is customized to the user based on the user interactions with these objects.

According to the method (100), the wearable AR system, and more specifically a capture device of the wearable AR system, identifies (block 101) a physical object. That is, a user may don a pair of spectacles that include 1) a capture device such as a camera and 2) a display device such as the transparent lens of the spectacles. As the user views the world and the objects therein, the camera captures what the user views. In some examples, a controller of the wearable AR system may implement object recognition to identify the objects that the user views.

As a particular example, a user may be looking at a countertop which has a variety of hygiene objects thereon. Through image analysis of the shapes of the objects as well as image analysis of the text on the different objects, the wearable AR system may identify the objects that are observed. For example, the controller of the wearable AR system may identify one object as a face cream and another object as a tube of toothpaste.

In addition to identifying passive, i.e., non-network-connected devices, the wearable AR system may identify network-connected devices. Put another way, the identified object may be a network-connected device that is in communication with the wearable AR system. That is, many objects that a user interacts with have network-connectivity and can communicate user interactions to the wearable AR system. For example, a thermostat in a home may be able to set temperatures based on monitored user activity patterns. The thermostat may also control the temperature based on actual user input, for example by rotating a dial. In either example, the thermostat may record this user interaction and provide data and metadata relating to the interaction to the wearable AR system. As such, the wearable AR system may identify (block 101) objects either by 1) image analysis of a captured scene or 2) received communication from network-connected devices.

As yet another example, the identification (block 101) of a non-network-connected object may be based on a network-connected capture device. For example, a home may include any number of devices that include cameras, which cameras can analyze an image and detect certain objects. Accordingly, either the capture device integrated with the wearable AR system or a separate capture device in communication with the wearable AR system may use image analysis to distinguish and identify objects within a particular field of vision.

The wearable AR system also monitors (block 102) user interaction with an identified object, as determined by the wearable AR system. That is, the wearable AR system may determine whether a user contacts, handles, or otherwise interacts with an object and may generate metadata relating to the interaction. Such metadata may indicate a duration of contact, a timestamp associated with the contact, and whether or not the user was interacting with the object while interacting with a second object etc. While particular reference is made to particular metadata that is collected, other metadata may be collected relating to an observed interaction. As a particular example, the wearable AR system may determine that at 7:15 p.m. the user grasped a night cream container and applied it to their face. As described above, such monitoring may be facilitated by the capture device integrated with the wearable AR system or with network-connected devices such as cameras.

In the example where the identified object is a network-connected device in communication with the wearable AR system, this monitoring (block 102) may include receiving, over a network, an indication of user interaction with the network-connected device. For example, a network-connected washing machine may include sensors that indicate when a user is doing the wash and metadata may indicate settings that are used. The network-connected washing machine may send metadata relating to these interactions to the wearable AR system such that an appropriate notification may be provided to the user as the network-connected washing machine comes within view of the user. As such, the present method (100) generates a user-specific routine based on extracted interactions between the user and the objects as captured by the wearable AR system or a network-connected device that is in communication with the wearable AR system.

Figure 8:
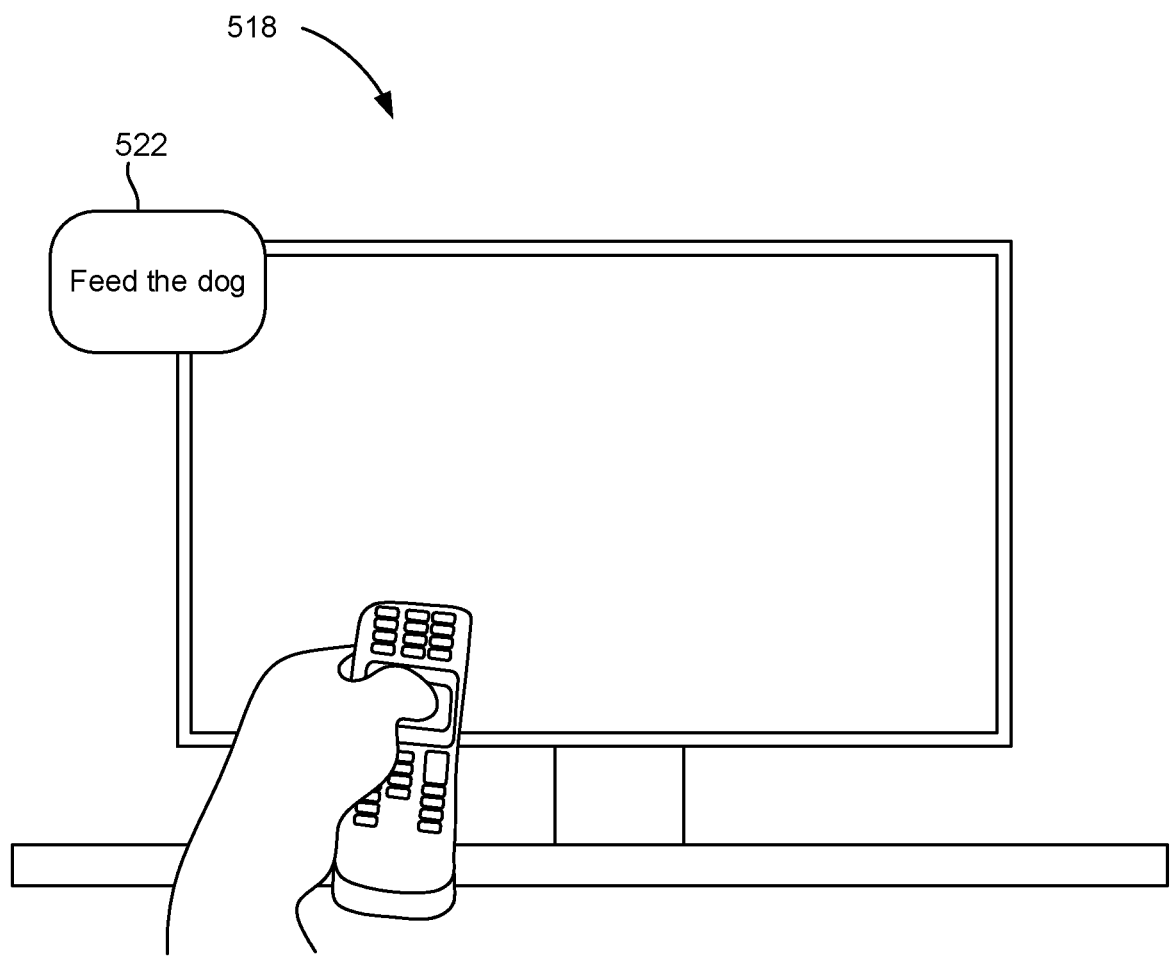
FIG. 8 depicts the presentation of a notification for an object, according to an example of the principles described herein.

Based on the user interactions, the method (100) includes generating (block 103) a notification related to the identified object. In some examples, the notification may be generated (block 103) responsive to the object coming within the view of the user. For example, when a user is standing in front of the countertop at 7:30 p.m., a notification may be generated (block 103) based on the user's historical routine of applying night cream around 7:15 p.m. each night. In other examples, the notification may be generated (block 103) even when the object is not within the view of the user, for example as depicted in FIG. 8 below.

Generation (block 103) of a notification may include classification of the notification. For example, a user interaction may be a part of a previously established routine for the user. In this example, the generation (block 103) may indicate that a task associated with the object is something that the user has previously performed and therefore may want to perform again.

As another example, the notification may be a recommended action that the user may not have previously performed or has not performed on a routine basis. For example, while sitting on a chair watching television, the capture device may identify a different colored patch of fabric on the chair, indicating a stain. In this example, the notification may be related to a non-routine, but recommended, task of cleaning the stain.

The notification may take a variety of forms. For example, the notification may be a pop-up window indicating a task (either as part of a routine or a non-routine recommendation) to be completed. In another example, the notification may include animated instructions to complete a task, such as including digital arrows directing the user to a location where the task may be completed. That is, the generation (block 103) of the notification, and the presentation parameters may be based on the category, or type, of object identified and/or the nature of the user interaction with that object.

A generated notification is then presented (block 104) on a display device of the wearable AR system. That is, the wearable AR system may include a wearable display device. For example, spectacles may include a transparent lens. In this example, the wearable AR system may project the notification or other digital information onto the transparent lens via for example a curved mirror display or a waveguide display. In some examples, the notification may be overlaid on top of the object to which the notification pertains. That is, through the transparent lens, a physical object may be viewable and distinguishable from other objects. In this example, the wearable AR system may generate an overlay, such as a highlighted outline around the object, and a textual presentation of the notification.

A specific example is now presented. In this example, the identified object may be a medicinal lozenge. In this example, the user interaction with the object may be from a network-connected calendar of the user which includes entries reminding the user to take their medication. In this example, the notification may be generated (block 103) which reminds the user to take the medication. In some examples, the presentation (block 104) of the notification may be generated responsive to the medicine container coming within the view of the user. For example, the notification may generate a highlighted outline of the medicine container with the text "take me to address your seasonal allergies" displayed thereon.

As will be described in more detail below, the visual placement, coloration, animation, duration, etc. of the notification may differ based on a number of criteria. For example, either through user input or other input, particular tasks may be assigned a particular priority. Based on the priority of a task, the mode of presentation may be altered to reflect the priority of the recommended task.

In some examples, the notification may be presented (block 104) to a third party via a secondary display device. That is, in addition to presenting (block 104) the notification through the wearable display device of the wearable AR system, the notification may be passed to an alternate person. Such an alternate individual may be one who is designated to assist in completion of the task either as a backup to the user wearing the AR system, or in case the user wearing the AR system is not responsive or otherwise unable or unavailable at that point in time. In another example, the wearable AR system may be implemented in a multi-user environment where the controller of the wearable AR system determines to whom the notification should be sent.

As such, the present method (100) identifies an object within an observation environment (i.e., through network connected devices and the capture device of the wearable AR system) and provides user specific visualizations providing recommendations of tasks to perform. As a particular example, when a user is watching television, a remote may be at their side. However, the user may be paying attention to the television and may not be cognizant that the remote battery is low. The remote, which may be a network-connected remote, may detect the battery level and provide an indication to the wearable AR system that the remote battery is low. In this example, the wearable AR system may generate and display a highlight around the remote and provide a textual notification such as "replace my batteries." In another example where a non-network-connected device is detected, the capture device may detect a mask to be worn outdoors and may detect stains on the mask via image analysis. Responsive to this analysis, a non-routine recommendation notification may be provided such as "your mask is dirty and should be washed."

Figure 2:
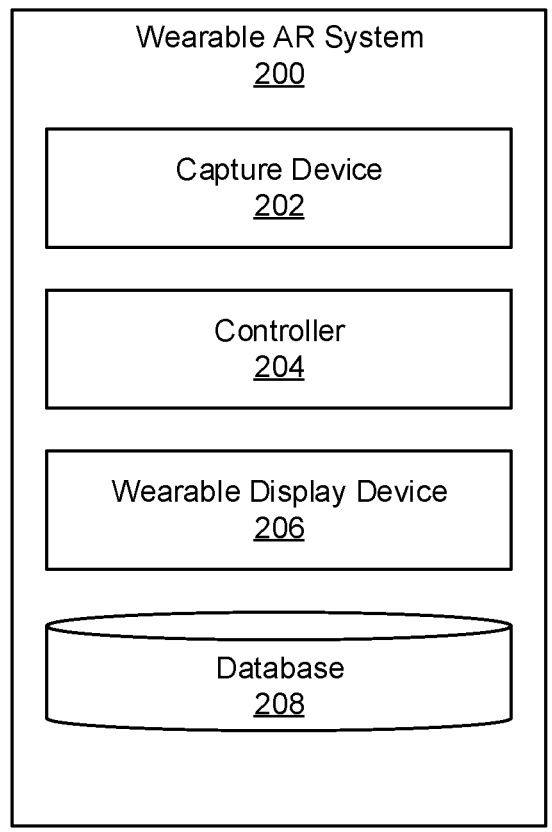
FIG. 2 depicts an AR system for monitoring and generating notifications for objects, according to an example of the principles described herein.

FIG. 2 depicts a wearable AR system (200) for monitoring and generating notifications for objects, according to an example of the principles described herein. As described above, the wearable AR system (200) monitors user interactions with objects and assists the user with their day-to-day activities by presenting notifications relating to objects, in some examples by overlaying the notifications over the objects. For example, a user may have a pattern of behavior over the course of a week. The wearable AR system (200) may be trained to recognize this pattern and provide customized visualizations via an AR display system. On a particular day, the wearable AR system (200) may suggest the user perform a task based on the pattern, which suggestion is provided to the wearable display device (206). That is, the wearable AR system (200) may be a machine-learning system that may establish routines based on observed interactions with objects over the course of a day, week, or month. The wearable AR system (200) may generate notifications and visualizations based on those interactions.

As described above, the wearable AR system (200) may include a capture device (202) to capture images viewed by a user of the wearable AR system (200). The capture device (202) may be a camera or other capture device that is integrated with the wearable AR system (200).

The wearable AR system (200) also includes a controller (204). To achieve its desired functionality, the controller (204) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of visually presenting customized notifications to users interacting with objects.

The controller (204) may identify an object within a captured image. That is, the capture device (202) may capture still images or video images of different physical world scenes viewed by the user. These images may be captured and processed by the controller (204) to distinguish the various objects depicted therein. Based on the identified objects, the controller (204) may generate a notification. As described above, the notification may include a task to be completed that relates to the identified object.

The wearable AR system (200) also includes a wearable display device (206), such as spectacle lenses, that may present the generated notification to the user of the wearable AR system (200). As described above, the notification may be presented as an overlay on top of the object that is identified, or may otherwise be overlaid across the physical world that is viewed through the wearable AR system (200).

Specific examples of the monitoring and presentation of notifications will now be provided. In a first example, the object may be one with which the user has interacted with on a regular basis. That is, during a calibration mode, the controller (204) may identify a user interaction with the identified object and identify a routine associated with the identified object. For example, the capture device may identify automobile keys on a table that the user passes by and picks up on weekday mornings around 6:15 a.m., presumably to go to work. Accordingly, in this example, the controller identifies that collecting the automobile keys is part of the routine of the user. The notification may relate to a deviation from the routine or an upcoming task within the routine. For example, at 6:00 a.m., a notification may be presented which reminds the user that they need to leave for work in 15 minutes. In another example, the capture device (202) may detect that the user has walked past the table without collecting the automobile keys. In this example, the controller (204) may generate a notification to remind the user to grab the automobile keys before walking out the door.

In another example, the controller (204) may interact with network-connected devices to identify the routine with the identified object. For example, a home may have a network-connected fan that is turned off each night at 10:00 p.m. The network-connected fan may collect this data and pass it to the controller (204) such that the controller (204) may determine that turning off the fan at 10:00 pm is a part of the routine. As described above, the notification that is generated may serve as a reminder for the upcoming activity or may notify a user that they have deviated from their routine of turning the fan off before going to bed. As such, the controller (204) may determine routine-based tasks by capturing interactions with non-network-connected devices and/or capturing interactions with network-connected devices. In either example, a routine-based notification may be generated and presented on the wearable display device (206).

In some examples, the notification may relate to a non-routine recommended task. That is, not all tasks that a user may wish to perform are part of the user's routine. For example, a user may desire to have a clean shed, but cleaning the shed may not be part of the user's routine. In this example, the notification may be a recommendation for a non-routine task. As another particular example, a user may not realize that their laptop computer is dusty. In this example, the capture device (202) may determine that the laptop within the field of view of the user is dusty and may provide a recommendation to clean the laptop.

As yet another example, the wearable AR system (200) may detect that a user is stressed, by for example detecting that the user passes many objects and handles them. This fidgety behavior may indicate that the user is stressed. In this example, the wearable AR system (200) may consult a database regarding treatment for stress, user input regarding their stress, and history regarding user-specific stress-alleviating techniques and may provide a notification to the user to "go for a walk" or "call a friend" for example.

Such recommended tasks may be sourced from a variety of locations. For example, the wearable AR system (200) may include a database (208) that includes tasks to be completed for a number of objects, whether those objects are routinely interacted with or not. In another example, the controller (204) may browse remote databases for tasks. In some examples, the recommendations may be based on user input and/or user history. For example, a user may express an interest in vehicle maintenance. In this example, the database (208) may be populated with tasks associated with vehicle maintenance. In another example, the controller (204) may be directed to specific remote databases that include information related to recommended tasks for vehicle maintenance.

As another example, the recommended tasks may be based on past user interactions with objects. For example, the wearable AR system (200) may detect and monitor various user interactions with exercise equipment. Accordingly, based on this information, the controller (204) may access the database (208) or browse remote web-based resources to find recommendations related to health and provide visual notification based on such. While particular reference is made to particular modes for obtaining the non-routine-based recommendations, any variety of modes for obtaining this information may be performed including data-mining and tracking user interaction across a variety of electronic devices. As described above, some of the recommendations may be provided from the database (208) while others may be learned from user behavior.

In one particular example, the notification that is generated may be based on previously captured images with the identified object. For example, a user may retrieve a particular book from a library shelf to read. It may be desirable to return the book to its original location on the shelf. Accordingly, the controller (204) may analyze a previously captured image of the book on the shelf and may provide a notification to the user of where the book should be placed to maintain the original organization of the shelf.

As described, the controller (204) may be a machine-learning system that identifies routines and generates notifications based on past activities by the user. That is, the controller (204) may be trained with details such user day-to-day activities, user routine, user preferences, and user likes and dislikes etc. Such training may occur during a calibration mode prior to notification generation and presentation. The training may continue during use such that a refined and more efficient and customized notification generation is provided.

In some examples, the generation and presentation of the notification is based on historical generation and consumption of notifications by the user. That is, not only is the generation of the notification customized based on a user's particular routine and particular interactions with objects, but the presentation of the notification is also customized per user. That is, each user may implement different icons, textual syntax, and verbiage in their communication. The presentation of the notification may be implemented based on those determined usages. That is, the controller (204) may extract patterns of usage from other devices such as computers, mobile phones, etc., to identify certain frequently used icons, textual phrases, etc. The presentation of the notification may implement those frequently used icons and textual phrases. That is, the controller (204) may take the inputs from the user communication usage patterns and use the patterns identified therein to make the presentation more customized to the user. As a particular example, the controller (204) may collect frequently used emoticons from social platforms that the user interacts with and use the same emoticons in the presented notification.

Figure 3:
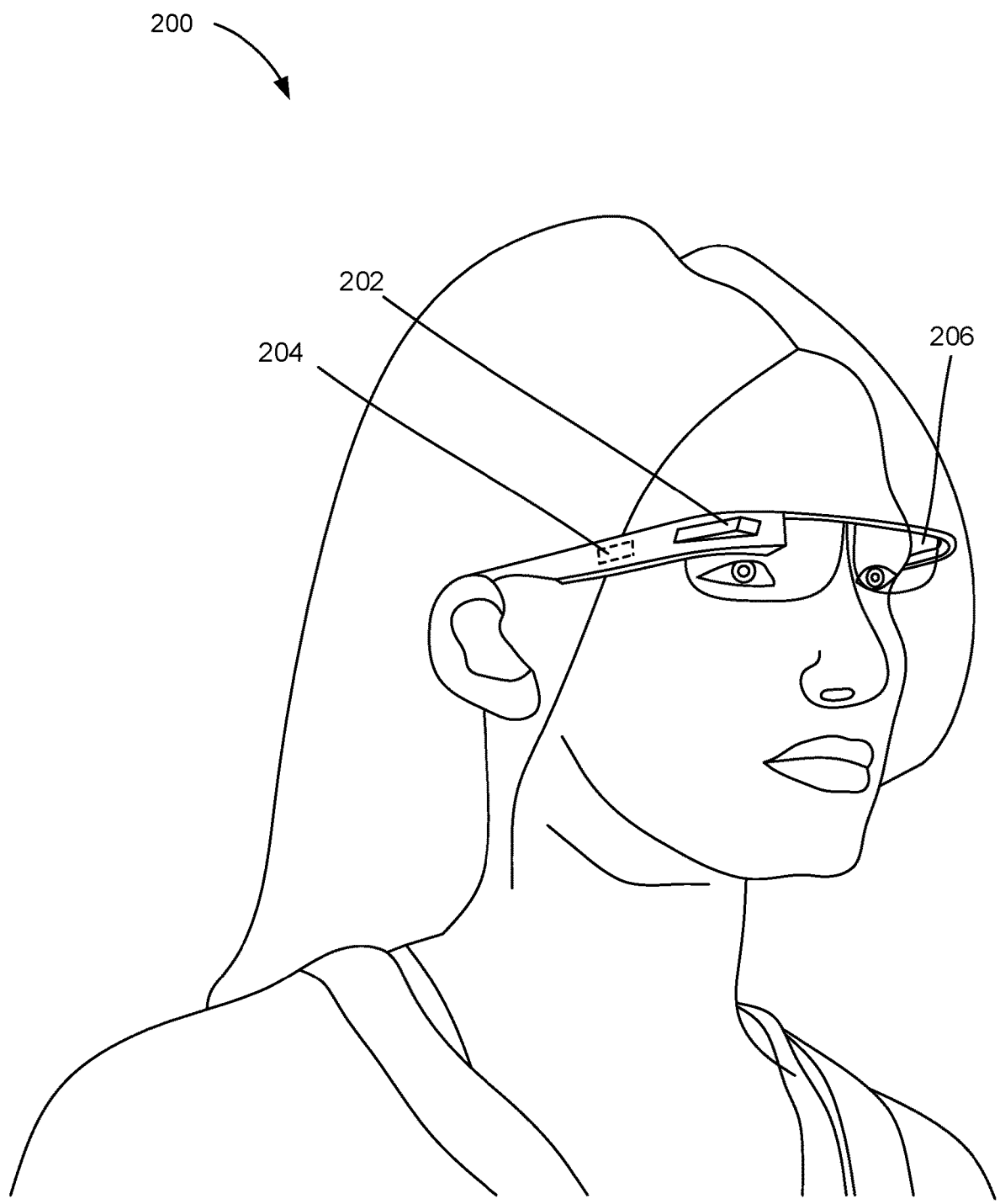
FIG. 3 depicts a wearable AR system for monitoring and generating notifications for objects, according to an example of the principles described herein.

FIG. 3 depicts a wearable AR system (200) for monitoring and generating notifications for objects, according to an example of the principles described herein. As described above, the wearable AR system (200) may be spectacles to be worn by the user. In this example, the capture device (202) is integrated into the frame of the spectacles. In this position, the camera may capture the physical world viewed by the user. In some examples, the capture device (202) may be adjustable to change the viewing angle. The controller (204) may also be integrated into the frame of the spectacles. In FIG. 3, the controller (204) is indicated in dashed lines to indicate its position interior to the frame of the spectacles.

When the wearable AR system (200) includes spectacles, the wearable display device (206) may be the transparent lens of the spectacles. That is, through the transparent lens, the user may view the physical world. Due to electrical connection between the controller (204) and the wearable display device (206), digital images, text, and other digital components may be presented on the transparent lens. For example, a digital element such as the digital highlight may overlay an object and a textual notification may be presented alongside the overlay.

In some examples, the wearable display device (206) may include a curved mirror display or a waveguide display. A curved mirror display may present the digital information by projecting an image onto a curved surface, i.e., the lens. In a waveguide display, projected light is bent in front of the eyes of the user to display a visual field. Light may be sent through the transparent lens (which may be glass or plastic) that is to reflect the light along the material. In this example, the light may bounce of a waveguide to a portion of the lens that is in front of the eye of the user. While particular reference is made to certain types of transparent spectacle displays, other types may be implemented in accordance with the principles described herein.

In an example, the wearable display device (206) includes an embedded display unit which can be adjusted on the spectacles. In this example, the user may be given an option to adjust the position of the display based on comfort. The captured surroundings will be visible as is to the user as they are in the physical world, and when there is a certain message that is to be displayed, the message may be displayed over the object based on a pre-defined position which is determined by the controller (204) and presented on the wearable display device (206).

Figure 4:
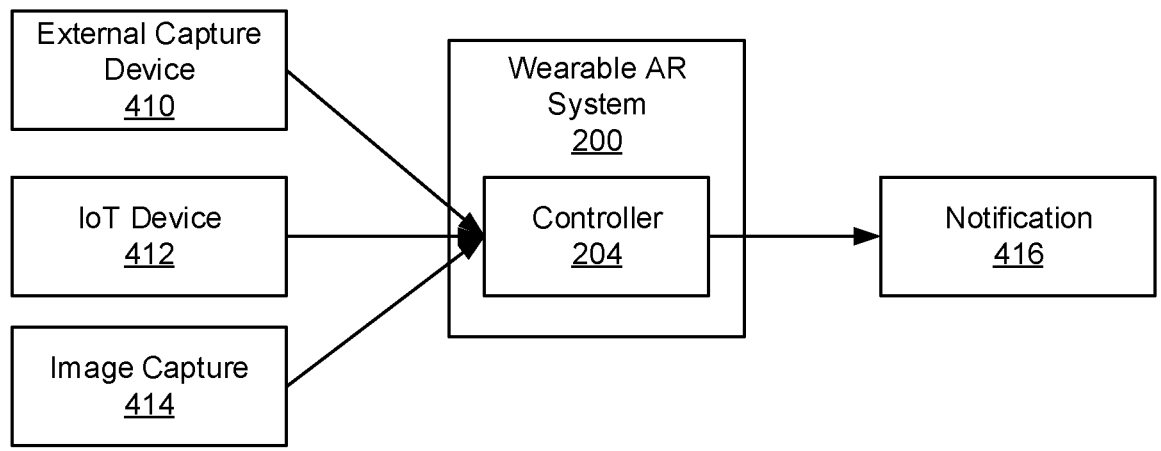
FIG. 4 depicts an environment in which the wearable AR system monitors and generates notifications for objects, according to an example of the principles described herein.

FIG. 4 depicts an environment in which the wearable AR system (200) monitors and generates notifications (416) for objects, according to an example of the principles described herein. Specifically, FIG. 4 depicts the various inputs used by the controller (204) of the wearable AR system (200) to both establish a user routine and generate notifications (416) associated with the routine, or other non-routine tasks. As described above, the controller (204) may receive input from network-connected devices, such as IoT devices (412). There may be a variety of IoT devices (412) that the controller (204) may interact with. Examples include, but are not limited to, smart thermostats, smart home appliances, smart lights, automobiles, sound systems, home automation equipment, and others. As a particular example, a manufacturing company may stock tablets in an IoT-enabled box. The IoT-enabled box may be able to identify and quantify the contents within the IOT-enabled box. In this example, the IoT-enabled box may include a network interface with the controller (204) such that as tablets are removed from the IoT-enabled box, the controller (204) is notified. As such, the controller (204) may generate a notification when the number of tablets within the IoT-enabled box reaches a threshold level, which notification may request that the user order additional tablets.

In another example, the IoT device (412) may be a washing machine that tracks what wash cycles are used and when those wash cycles are initiated. Similar to the IoT-enabled box, the washing machine may pass such information to the controller (204) such that the controller (204) may generate a notification, either when the user is in the vicinity of the washing machine or otherwise, that the user has deviated from a normal routine of laundering clothes. While particular reference is made to certain IoT devices (412), the controller (204) may interact with, and collect input from any variety of IoT devices (412).

In another example, the controller (204) may interact with an external capture device (410). That is, as described above, the wearable AR system (200) itself may include a capture device (FIG. 2, 202) such as a camera. However, in some examples, an external capture device (410) such as a camera may be able to capture the user's interactions with objects. For example, the object may be a book that is resting on a side table of a couch. The home camera may be able to identify the book from image analysis as described above. Based on the captured data passed to the wearable AR system (200), the controller (204) may determine that a user picks up the book around the same time in the evening. In this example, the wearable AR system (200) may establish a routine of the user related to the book and provide the associated and proper notifications. In this example, the controller (204) relies on the image analysis capabilities of the external capture device (410).

In another example, input to the controller (204) may be images (414) captured from the capture device (FIG. 2, 202) of the wearable AR system (200) itself. That is, the capture device (FIG. 2, 202) and the controller (204) may have object recognition capabilities where objects within a captured scene are recognized and identified. This data, along with image recognition of a user interacting with the object, may be used to generate the aforementioned notification (416). That is, the wearable AR system (200) may detect interaction from non-network connected devices (either through network connected devices or image analysis) and network-connected devices to generate customized routines and recommendations that are presented on the wearable display (FIG. 2, 206) in a fashion that is customized to the user.

Figure 5:
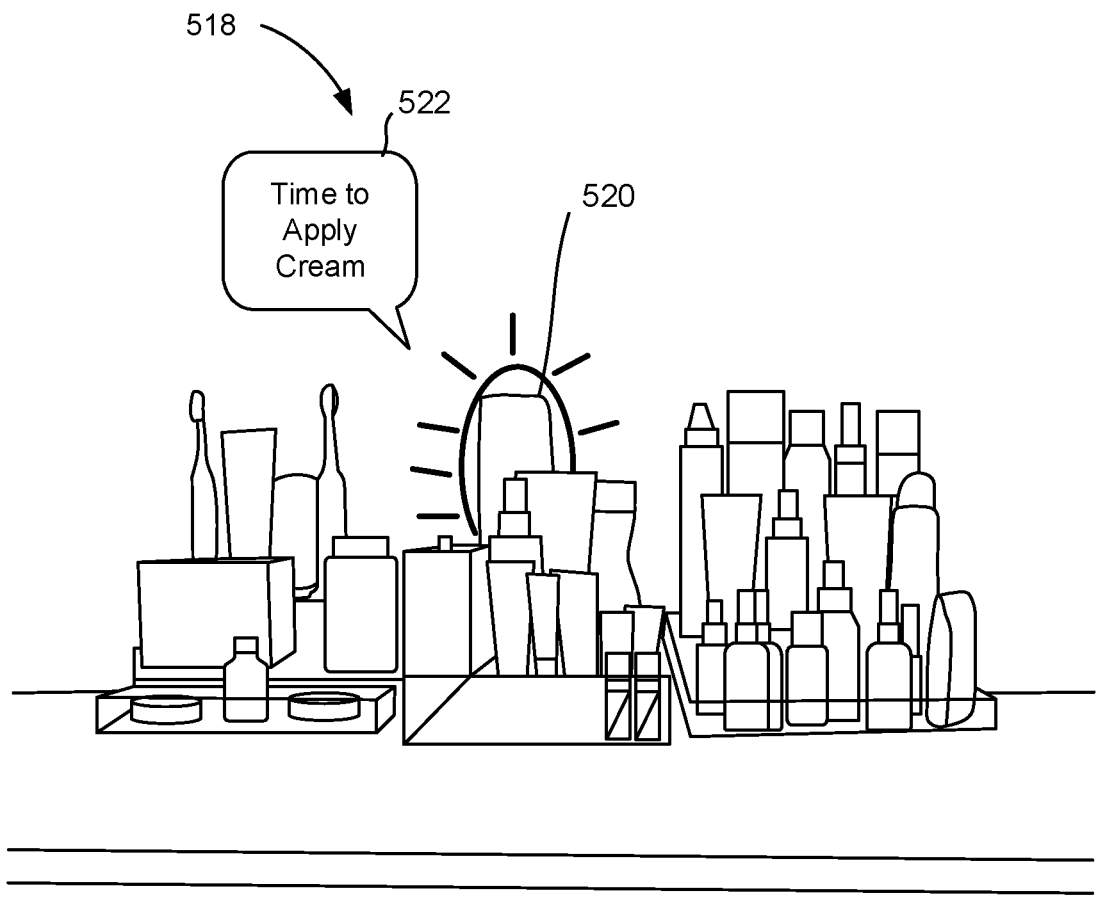
FIG. 5 depicts the presentation of a notification for an object, according to an example of the principles described herein.

FIG. 5 depicts the presentation of a notification (522) for an object (520), according to an example of the principles described herein. As described above, in some examples, identifying the object (520) may be based on image analysis of a captured scene (518). In the example depicted in FIG. 5, the captured scene (518) is of a countertop with various products disposed thereon. In this example, based on the shape of the object (520) as well as text that is on the object (520), the controller (FIG. 2, 204) may be able to distinguish the highlighted container as a night cream container. That is, during image analysis, the controller (FIG. 2, 204) may be able to distinguish and identify certain objects. In some examples, the identification of the object may be based on a comparison of the extracted object with known objects either from a training database or from scouring remote sources such as the internet.

A specific example of object recognition within an image is now described. In this example, the wearable AR system (FIG. 2, 200) may be trained to recognize objects in an image via a training data set. Specifically, sample images may be captured from various sources. The images may be split into a training data set and a testing data set. The model, such as a neural network may be trained with the training data set and tested with the testing data set to capture an accuracy of the model.

To make object recognition more accurate, the wearable AR system (FIG. 2, 200) where, for a predefined period of time, the wearable AR system (FIG. 2, 200) just captures data relating to the wearer's interaction with objects and adds this captured data to the training data set. After this period of time, the objection recognition may be more accurate with respect to the objects that the wearer interacts with. Accordingly, during use, the capture device (FIG. 2, 202) captures images, an image stream, or a video stream. These captured images are passed by the object recognition application of the controller (FIG. 2, 204) to provide a label for the image. As such, the wearable AR system (FIG. 2, 200) may be a machine-learning system. In this example, even during use, that is after the predefined period of time when interactions are collected but not used to form part of a routine, captured interactions may be added to the object recognition model such that the model is continuously updated.

In this example, interaction with this object (520) may form part of a routine of the user. For example, the controller (FIG. 2, 204), based on machine-learning analysis of image capture data from the capture device (FIG. 2, 202) and object identification of the captured images, may determine that at a particular time of night, the user reaches for the object (520), which is night cream, and applies it to their face. In this example, the controller (FIG. 2, 204) may determine based on a calendar, that the particular time of night is upcoming and may provide the notification to the user. In another example, the controller (FIG. 2, 204) may determine that the particular time has passed, and may provide a reminder to the user. As described above, such a reminder may be customized to the user and may be overlaid on the object (520). That is, the user may view the actual scene (518) through the spectacles, and a digital notification (522) and highlight may be overlaid on top of the object (520) to provide instruction and guidance to the user.

In some examples, such a notification may be presented when the object (520) is within the field of vision of the user. That is, as the user is standing in front of the counter, the capture device (FIG. 2, 202) may detect the object (520) and provide the reminder. In other examples, the presentation of the notification (522) may be based on the routine, notwithstanding the user is not in front of the object (520). An example of such a notification (522) is presented below in connection with FIG. 8.

In another example, the notification (522) may be non-routine-based rather than routine-based. That is, based on past user history, user input, or based on a recommendation database, the controller (FIG. 2, 202) may identify application of face cream as a desired task. Accordingly, the controller (FIG. 2, 204) may generate a non-routine recommendation to apply a face cream.

Figure 6:
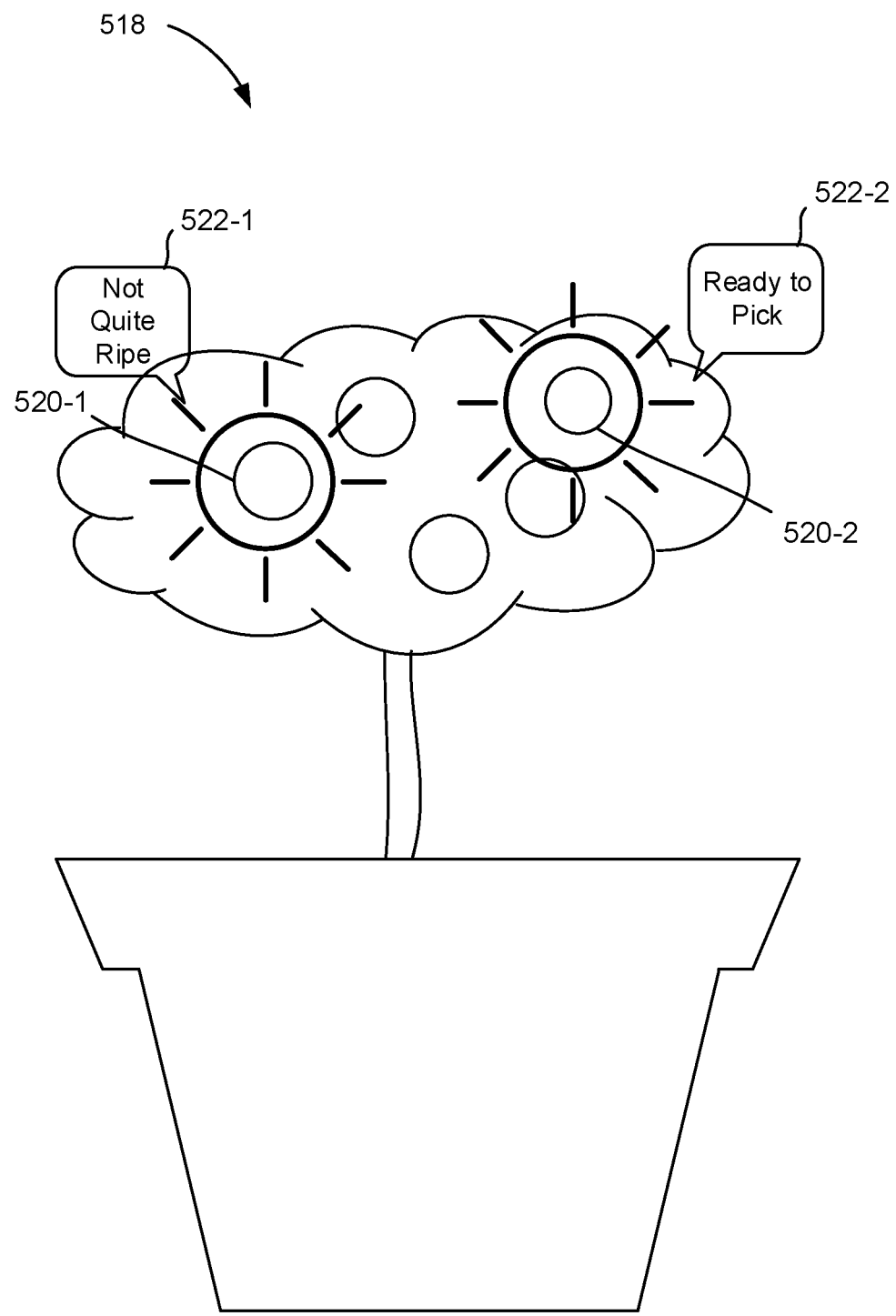
FIG. 6 depicts the presentation of a notification for an object, according to an example of the principles described herein.

FIG. 6 depicts the presentation of a notification (522) for an object (520), according to an example of the principles described herein. Specifically, FIG. 6 depicts non-routine-based notifications (522). In the example depicted in FIG. 6, the scene (518) captured is of a fruit tree with fruit. In this example, the task may be related to whether or not to pick the fruit on the tree. Whether or not to pick fruit may not form part of a routine for the user, but nevertheless may be an action desirable for the user. That is, the controller (FIG. 2, 204) may not have the routine-based information on which to make a recommendation.

In this example, the capture device (FIG. 2, 202) may capture a scene (518) that depicts the fruit on the tree. The controller (FIG. 2, 204) may then scour any database, whether on the wearable AR system (FIG. 2, 200) or remote, for information relating to the fruit tree. In some examples, whether or not the controller (FIG. 2, 204) is to generate a notification (FIG. 4, 416) relating to the fruit tree, or the sources that the controller (FIG. 2, 204) is to scour to identify a recommended task may be identified by a user. That is, the user may input interest in fruit free harvesting or may indicate a particular domain to search for recommended tasks.

In another example, capture of the fruit tree in the image may trigger searching remote databases for recommended tasks. In either example, a notification (522) may be presented and in this case overlaid over the object (520). For example, a first notification (522-1) may compare the hue of the first object (520-1) with a database entry and may determine that it is not ripe for picking. By comparison, the hue of another object (520-2) may match the hue of a ripe fruit as identified from an informational article regarding the harvest of the fruit. As such, the notification (522-2) may indicate that the second fruit is ripe for picking. As such, the wearable AR system (FIG. 2, 200) may rely on non-routine activities in providing a recommendation, where the recommendation is sourced from informational articles or other resources related to the identified object (520).

Figure 7:
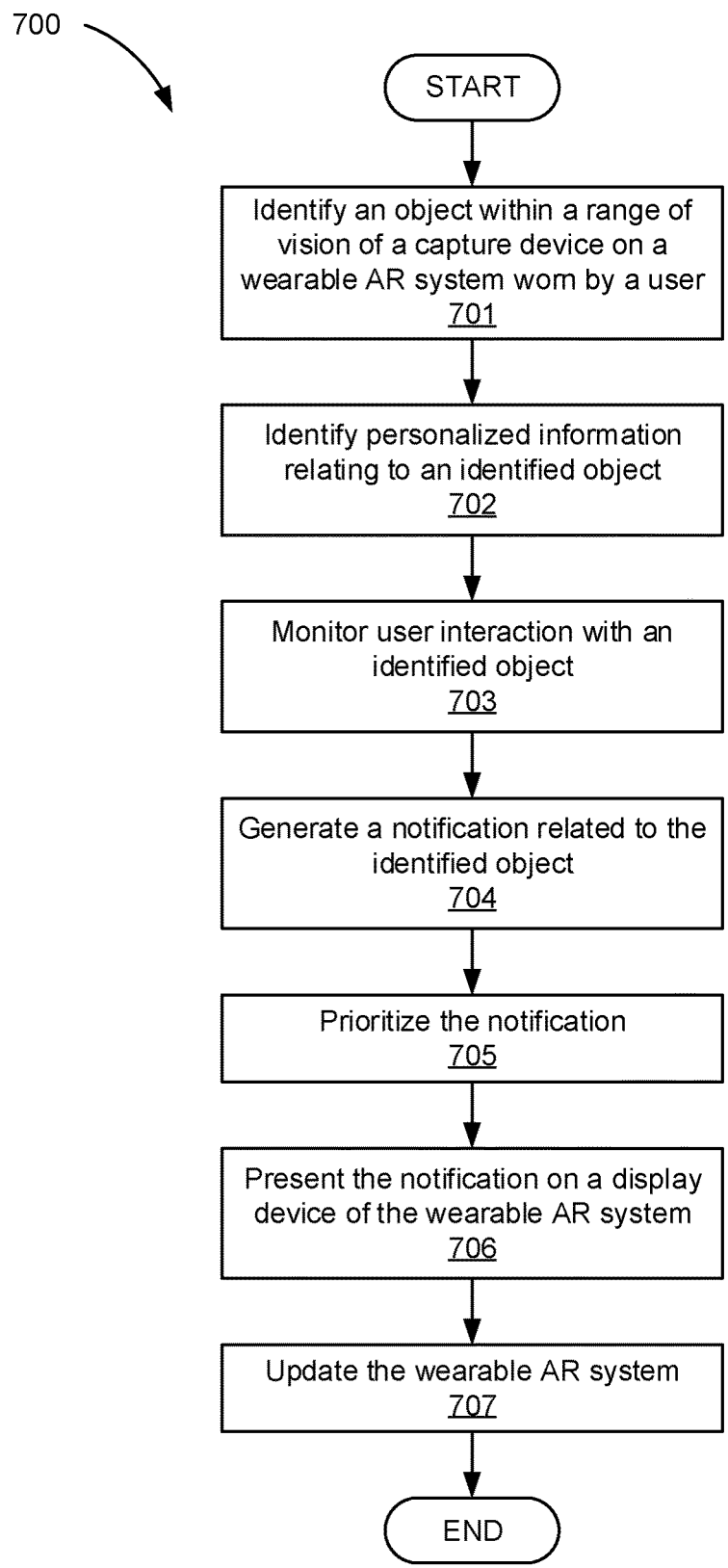
FIG. 7 depicts a computer-implemented method for monitoring and generating notifications for objects in an AR system, according to an example of the principles described herein.

FIG. 7 depicts a computer-implemented method (700) for monitoring and generating notifications (FIG. 5, 522) for objects (FIG. 5, 520) in an AR system (FIG. 2, 200), according to an example of the principles described herein. According to the method (700), an object (FIG. 5, 520) that is within a range of the vision of a capture device (FIG. 2, 202) of a wearable AR system (FIG. 2, 200) is identified (block 701). This may be performed as indicated above in regards to FIG. 1.

User information relating to the object (FIG. 5, 520) may be identified (block 702). For example, a history of user interactions with the identified object (FIG. 5, 520) may be kept. This may include monitoring (block 703) user interaction with the identified object (FIG. 5, 520) as described above in connection with FIG. 2.

The controller (FIG. 2, 204) of the wearable AR system (FIG. 2, 200) may then generate (block 704) a notification (FIG. 5, 522) related to the identified object (FIG. 5, 520). The controller (FIG. 2, 204) may also prioritize (block 705) the notification (FIG. 5, 522). In regards to a routine-based task, the controller (FIG. 2, 204) may consider the priority of the current deviation and determine if the notification (FIG. 5, 522) should be presented or displayed, based on the priority of the current deviation as it compares to the priority of a current activity of the user. That is, if the user is currently in a business meeting, a notification (FIG. 5, 522) to feed the dog may be delayed based on the higher priority attributed to the meeting as opposed to the priority of feeding the dog. In another example, if the user is watching TV, as depicted in FIG. 8, which may be a low priority activity, the notification (FIG. 5, 522) relating to the feeding of the dog may be presented.

The priority of different activities of the user may be based on any number of criteria including user input, user history, user calendar, and a level of engagement of the user during the activity. For example, a user may indicate that they are not to be disturbed during meetings or may set a priority value indicating those notifications that may be presented to them while in a meeting. In this example, the user may assign priority values to different activities. As such, user activities that have a priority value higher than the threshold of the current activity, or higher than a value indicated by a user, may be presented.

As another example, user history may be relied on in determining priority. For example, when a task is recommended during a particular activity, if a user has a history of not performing the task while performing that activity, the machine-learning system may infer a higher priority for the current activity and prevent the recommendation in future instances. As yet another example, the wearable AR system (FIG. 2, 200) may consult a calendar for the user in determining whether to provide the notification (FIG. 5, 522). As yet another example, the controller (FIG. 2, 204) may determine a level of engagement of the user. This may be done by analyzing the image capture data and or receiving input from other sensors such as biometric sensors that may be integrated with the wearable AR system (FIG. 2, 200). That is, the wearable AR system (FIG. 2, 200) may include biometric sensors. The output of such sensors may determine a level of engagement of the user. If a user is engaged in a current activity, as determined by the biometric sensors, the controller (FIG. 2, 204) may delay presentation of the notification (FIG. 5, 522).

The priority of the deviation from the routine or recommended task may also determine the format of the notification (FIG. 5, 522). For example, the priority level may determine the placement, emphasis, and duration of the notification (FIG. 5, 522) to catch the user's attention as desired contextually.

The controller (FIG. 2, 204) may then present (block 706) the notification (FIG. 5, 522) on the wearable display device (FIG. 2, 206) as described above in connection with FIG. 2.

As described above, the wearable AR system (FIG. 2, 200) may be a machine-learning system that is continually trained with new data points. Accordingly, the controller (FIG. 2, 204) may update (block 707) the wearable AR system (FIG. 2, 200). Such updates may come in a variety of forms. For example, the controller (FIG. 2, 204) may update an identified object (FIG. 5, 520) based on user feedback. That is, the image analysis of a captured image may incorrectly identify an object. In this example, the controller (FIG. 2, 204) may provide a mechanism whereby a user may indicate either a correct identification of the object (FIG. 5, 520) or an incorrect identification of the object (FIG. 5, 520). In either case, this user feedback may be used to re-train, or further train, a machine-learning controller (FIG. 2, 204) to be more accurate going forward.

As another example, the controller (FIG. 2, 204) may update the priority of a task associated with an identified object (FIG. 5, 520) based on user feedback. That is, as described above a priority may be assigned to different tasks. In some examples, the initial priority, and updated priorities, may be based on user feedback. For example, a user may indicate a numeric value, or a label indicating a relative priority of the task. As described above, this priority may be considered when determining whether and when to present the notification (FIG. 5, 522) and the presentation characteristics (i.e., size, emphasis, duration), of the notification (FIG. 5, 522). Similarly, the controller (FIG. 2, 204) may update the priority of the current activity based on user feedback. That is, the user may indicate a numeric value or a label indicating a relative priority of the task. This priority as well may be considered when determining when and whether to present a notification (FIG. 5, 522) when the user is engaging in the current activity.

As another example, the presentation of the notification (FIG. 5 522) may be based on historical usage. For example, if a user is non-responsive to a recommendation to read from a book, the routine task of reading from a book may be associated with a low priority. As another example, if a user historically does not respond to notifications (FIG. 5, 522) received during a business meeting, the controller (FIG. 2, 204) may assign a high priority to business meetings such that the user is not interrupted with lower threshold notifications during business meetings.

FIG. 8 depicts the presentation of a notification (522) for an object (FIG. 5, 520), according to an example of the principles described herein. The captured scene (518) depicted in FIG. 8 is of a user watching a television. As watching television may not require heightened levels of engagement, it may be deemed a low priority activity such that a notification (522), in this case the text "feed the dog," may be presented on the transparent wearable display device (FIG. 2, 206).

Figure 9:
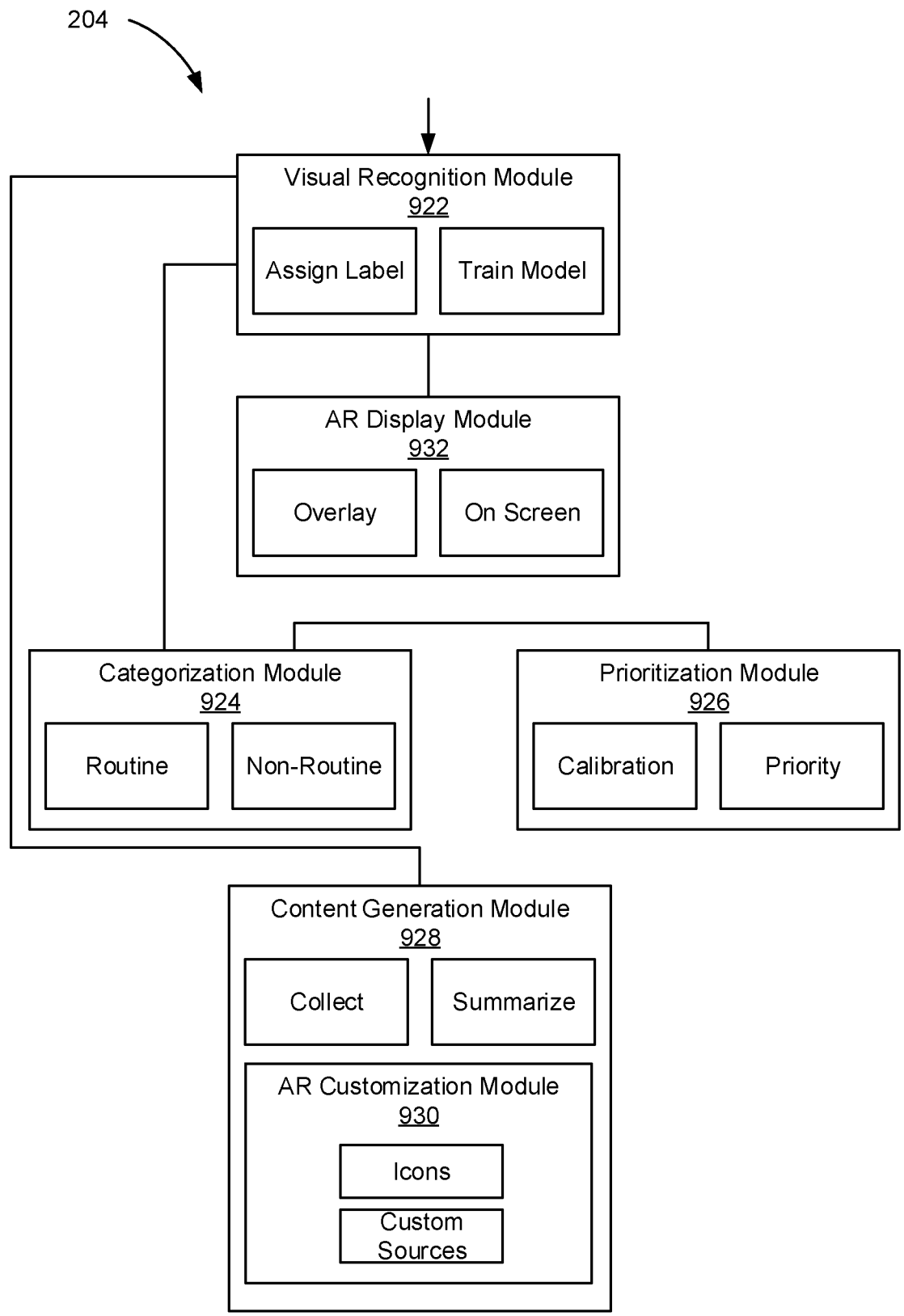
FIG. 9 depicts a wearable AR system for monitoring and generating notifications for objects, according to an example of the principles described herein.

FIG. 9 depicts a controller (FIG. 2, 204) of a wearable AR system (FIG. 2, 200) for monitoring and generating notifications (FIG. 5, 522) for objects (FIG. 5, 520), according to an example of the principles described herein. To achieve its desired functionality, the controller (204) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of visually presenting customized notifications to users interacting with objects.

The controller (FIG. 2, 204) may include a visual recognition module (922) which receives a captured image stream or a video stream from a capture device (FIG. 2, 202) of the wearable AR system (FIG. 2, 200). The visual recognition module (922) assigns a label to objects (FIG. 5, 520) of the captured image stream. As described above, the visual recognition module (922) may train a model by backpropagating the captured image to the trained model. The label may be passed to a categorization module (924) which may categorize the label as a routine-based day-to-day activity or a non-routine activity. The prioritization module (926) captures user activity for a predefined period of time to calibrate the model with user behavior and assigns priority to the tasks/activity and backpropagates the captured activity to the model. Once the priority is derived, the content generation module (928) receives the label, category, and priority as input and in some examples collects data from databases and summarizes the data and generates customized notifications (FIG. 5, 522) to be displayed on the object (FIG. 5, 520). The AR customization module (930) of the content generation module (928) identifies emoticons and syntax previously used by the user and references APIs and other custom sources to generate the content and format of the notification (FIG. 5, 522). The AR display module (932) then displays the notification (FIG. 5, 522) on the wearable display device (FIG. 2, 206) and in some examples overlays the object (FIG. 5, 520) that is tied to the notification (FIG. 5, 522).

Figure 10:
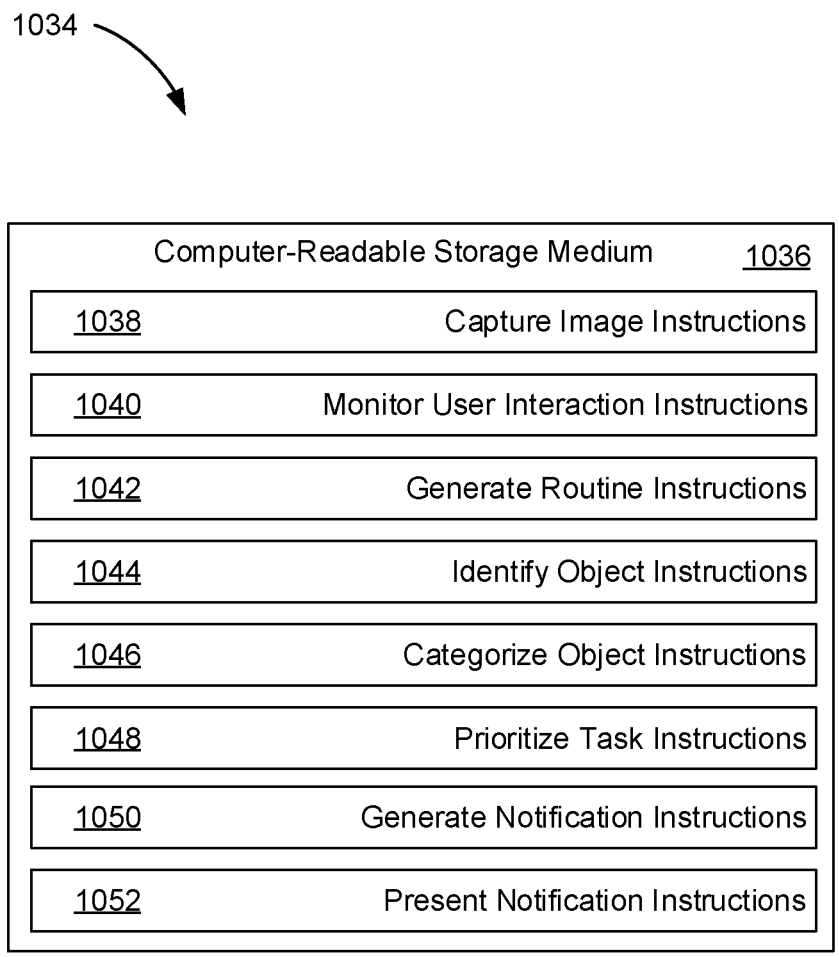
FIG. 10 depicts a computer program product with a computer readable storage medium for monitoring and generating notifications for objects, according to an example of principles described herein.

FIG. 10 depicts a computer program product (1034) with a computer readable storage medium (1036) for monitoring and generating notifications for objects, according to an example of principles described herein. To achieve its desired functionality, the wearable AR system (FIG. 2, 200) includes various hardware components. Specifically, a computing system includes a processor and a computer-readable storage medium (1036). The computer-readable storage medium (1036) is communicatively coupled to the processor. The computer-readable storage medium (1036) includes a number of instructions (1038, 1040, 1042, 1044, 1046, 1048, 1050, 1052) for performing a designated function. The computer-readable storage medium (1036) causes the processor to execute the designated function of the instructions (1038, 1040, 1042, 1044, 1046, 1048, 1050, 1052).

Referring to FIG. 10, capture image instructions (1038), when executed by the processor, cause the processor to capture images viewed by a user of the wearable AR system (FIG. 2, 200). Monitor user interaction instructions (1040), when executed by the processor, may cause the processor to, during a calibration period, monitor user interaction with a first set of identified objects (FIG. 5, 520) within captured images. Generate routine instructions (1042), when executed by the processor, may cause the processor to, during a calibration period, generate a routine of the user with the first set of identified objects (FIG. 5, 520). Identify object instructions (1044), when executed by the processor, may cause the processor to identify an object within a range of vision of the user via a capture device (FIG. 2, 202) on the wearable AR system (FIG. 2, 200). Categorize object instructions (1046), when executed by the processor, may cause the processor to categorize an identified object (FIG. 5, 520) as belonging to the first set of identified objects associated with the routine or a second set of identified non-routine objects. Prioritize task instructions (1048), when executed by the processor, may cause the processor to prioritize a task associated with an identified object (FIG. 5, 520). Generate notification instructions (1050), when executed by the processor, may cause the processor to generate a notification (FIG. 5, 522) related to the identified object (FIG. 5, 520). Present notification instructions (1052), when executed by the processor, may cause the processor to present the notification (FIG. 5, 522) on a wearable display device (FIG. 2, 207) of the wearable AR system (FIG. 2, 200) based on a priority of the task associated with the identified object, a priority of a current activity of the user, and which set the identified object belongs to.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying an object within a range of vision of a user via a capture device on a wearable augmented reality (AR) system worn by the user;
    monitoring user interaction with an identified object within the range of vision of the user;
    extracting patterns of usage from a plurality of other devices to identify at least one icon or textual phrase utilized by the user;
    implementing the at least one icon or textual phrase in content of a notification related to the identified object;
    generating a notification related to the identified object, wherein the notification includes the at least one icon or textual phrase in the content;
    determining an activity in which the user is currently involved;
    comparing a priority of the notification with a priority of the activity in which the user is currently involved;
    when the priority of the activity in which the user is currently involved exceeds the priority of the notification, delaying presentation of the notification to the user based on the higher priority of the activity; and
    selectively presenting the notification on a display device of the wearable AR system.

2. The computer-implemented method of claim 1, wherein:
    the identified object is a network-connected object in communication with the wearable AR system; and
    monitoring user interaction with the network-connected object comprises receiving, over a network, a report of user input entered by the user to the network-connected device.

3. The computer-implemented method of claim 1, wherein identifying an object is based on image analysis of a captured scene.

4. The computer-implemented method of claim 1, further comprising, if the user has a history of not performing a task corresponding to the notification while performing the activity, inferring a higher priority for the activity and preventing the notification in future instances.

5. The computer-implemented method of claim 1, wherein prioritizing the notification is based on at least one of:
    user input assigning a particular priority to the notification,
    user history regarding a task of the notification,
    a user calendar; and
    a level of engagement of the user in the current activity.

6. The computer-implemented method of claim 1, further comprising:
using machine learning to learn a routine of the user with the identified object; and
generating content or timing of the notification based on the user's prior interaction with the identified object as represented by the learned routine.

7. The computer-implemented method of claim 1, wherein the notification comprises a highlighted outline on the display device of the wearable AR system around the identified object.

8. The computer-implemented method of claim 1, wherein a controller of the wearable AR system determines whether to present the notification to the user or to another party via a secondary display device.

9. A wearable augmented reality (AR) system, comprising:
a capture device to capture images viewed by a user of the wearable AR system;
a controller to:
identify an object within a captured image;
use machine learning to learn a routine of the user with the identified object;
extract patterns of usage from other devices to identify icons or textual phrases utilized by the user and implement the icons or textual phrases in content of a notification related to the identified object; and
generate the notification related to the identified object, wherein the notification comprises a task to be completed that relates to the identified object, with the content or timing of the notification being based on the learned routine of the user with the identified object; and
a wearable display to present the notification to the user of the wearable augmented reality system.

10. The wearable AR system of claim 9, wherein the notification directs the user where to put the identified object after use.

11. The wearable AR system of claim 9, wherein the controller is further to:
compare a priority of the notification with a priority of an activity in which the user is currently involved; and
when the priority of the activity in which the user is currently involved exceeds the priority of the notification, delaying presentation of the notification to the user based on the higher priority of the activity.

12. The wearable AR system of claim 11, wherein the priority of different user activities is based on any of user input specifying a priority for an activity, the user's historical routine, the user's calendar, or a level of engagement of the user in the current activity.

13. The wearable AR system of claim 9, wherein:
the identified object is something that needs to be cleaned; and
the notification includes a recommendation for the cleaning.

14. The wearable AR system of claim 9, wherein:
the notification relates to at least one of a deviation from the user's learned routine and an upcoming activity related to the routine.

15. The wearable AR system of claim 14, wherein the controller is to interact with other network-connected devices to identify the routine with the identified object.

16. The wearable AR system of claim 9, wherein generation and presentation of the notification is based on historical generation and consumption of notifications by the user.

17. The wearable AR system of claim 9, wherein the notification comprises a recommendation to take medication.

18. A computer program product, the computer program product comprising a computer readable storage medium having program instructions embodied therewith, the program instructions executable by a processor, to cause the processor to:
identify an object within a range of vision of a user via a capture device on a wearable augmented reality (AR) system worn by the user;
monitor user interaction with an identified object within the range of vision of the user;
extract patterns of usage from a plurality of other devices to identify at least one icon or textual phrase utilized by the user;
implement the at least one icon or textual phrase in content of a notification related to the identified object;
generate a notification related to the identified object, wherein the notification includes the at least one icon or textual phrase in the content;
determine an activity in which the user is currently involved;
compare a priority of the notification with a priority of the activity in which the user is currently involved;
when the priority of the activity in which the user is currently involved exceeds the priority of the notification, delay presentation of the notification to the user based on the higher priority of the activity; and
selectively present the notification on a display device of the wearable AR system.

19. The computer program product of claim 18, wherein:
the identified object is a network-connected object in communication with the wearable AR system; and
program instructions executable by the processor, to cause the processor to monitor user interaction with the network-connected object further comprises, program instructions executable by the processor, to cause the processor to receive, over a network, a report of user input entered by the user to the network-connected device.

20. The computer program product of claim 18, wherein program instructions executable by the processor, to cause the processor to identify an object is based on image analysis of a captured scene.

* * * * *